US011451608B1

(12) United States Patent
Karras et al.

(10) Patent No.: US 11,451,608 B1
(45) Date of Patent: *Sep. 20, 2022

(54) MULTI-DEVICE WORK FLOW MANAGEMENT METHOD AND SYSTEM FOR MANAGING WORK FLOW DATA COLLECTION FOR USERS ACROSS A DIVERSE SET OF DEVICES AND PROCESSES BY UNIFYING THE WORK PROCESS TO BE DATA AND DEVICE AGNOSTIC

(71) Applicant: United Services Automobile Association (USAA), San Antonio, TX (US)

(72) Inventors: James T. Karras, Boerne, TX (US); Ryan James Fillinger, Prosper, TX (US); Neal Philip Balzer, Boerne, TX (US); Randal Lane Schnedler, San Antonio, TX (US); Douglas A. Hall, Lucas, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 120 days.

This patent is subject to a terminal disclaimer.

(21) Appl. No.: 16/894,497

(22) Filed: Jun. 5, 2020

Related U.S. Application Data

(62) Division of application No. 15/479,178, filed on Apr. 4, 2017, now Pat. No. 10,681,182.
(Continued)

(51) Int. Cl.
*H04L 29/06* (2006.01)
*H04L 67/01* (2022.01)
(Continued)

(52) U.S. Cl.
CPC .............. *H04L 67/01* (2022.05); *G06F 9/452* (2018.02); *G06F 16/2379* (2019.01); *G06F 16/951* (2019.01); *H04L 61/5007* (2022.05)

(58) Field of Classification Search
CPC ......... H04L 67/42; H04L 61/20; G06F 9/452; G06F 16/2379; G06F 16/951
See application file for complete search history.

(56) References Cited

U.S. PATENT DOCUMENTS

| 5,008,810 A | * | 4/1991 | Kessel | G06F 9/453 700/86 |
| 5,047,959 A | * | 9/1991 | Phillips | G06F 8/38 715/744 |

(Continued)

OTHER PUBLICATIONS

U.S. Appl. No. 15/479,178, filed Apr. 4, 2017.
U.S. Appl. No. 62/319,057, filed Apr. 6, 2016.

*Primary Examiner* — Vivek Srivastava
*Assistant Examiner* — Wuji Chen
(74) *Attorney, Agent, or Firm* — Perkins Coie LLP (57) ABSTRACT

Embodiments disclosed herein may relate to systems and methods for managing work flow data collection for users across a wide area network comprising a diverse set of devices and processes and unifying the work process to be device agnostic. Embodiments disclosed herein may allow a single process having multiple steps to be retrieved and continued across multiple channels and devices with apparent continuity to the end-user. The status of each process step is tracked and the inputs are stored, providing the system with the requisite information when users continue processes on a different channel or device from the original channel or device. The system may host and execute processes that may be presented and manipulated across the various channels and devices, but without requiring engineers and developers to write or otherwise tailor software (Continued)

applications and network configurations to facilitate or allow multi-channel interactions.

20 Claims, 5 Drawing Sheets

Related U.S. Application Data (60) Provisional application No. 62/319,057, filed on Apr. 6, 2016.

(51) Int. Cl.
*G06F 16/23* (2019.01)
*G06F 16/951* (2019.01)
*G06F 9/451* (2018.01)
*H04L 61/5007* (2022.01)

(56) References Cited

U.S. PATENT DOCUMENTS

| | | | | |
|---|---|---|---|---|
| 5,463,555 | A * | 10/1995 | Ward | G06Q 10/087 705/28 |
| 5,502,840 | A * | 3/1996 | Barton | G06F 9/52 710/200 |
| 5,544,299 | A * | 8/1996 | Wenstrand | G06F 3/0489 715/802 |
| 5,828,655 | A * | 10/1998 | Moura | H04N 21/2381 455/67.11 |
| 6,078,890 | A * | 6/2000 | Mangin | G06Q 40/08 705/2 |
| 6,141,647 | A * | 10/2000 | Meijer | G06Q 10/06 700/109 |
| 6,185,184 | B1 * | 2/2001 | Mattaway | H04L 12/1813 370/230 |
| 6,345,259 | B1 * | 2/2002 | Sandoval | G06Q 20/20 700/109 |
| 6,691,153 | B1 * | 2/2004 | Hanson | G07F 17/3288 709/204 |
| 7,487,248 | B2 | 2/2009 | Moran | |
| 7,526,559 | B1 * | 4/2009 | Phillips | H04L 67/02 709/227 |
| 7,676,583 | B2 | 3/2010 | Eaton | |
| 7,685,296 | B2 * | 3/2010 | Brill | G06F 16/951 709/204 |
| 7,707,196 | B2 * | 4/2010 | Bellaiche | G06F 16/9558 709/225 |
| 7,809,842 | B2 | 10/2010 | Moran | |
| 7,966,369 | B1 * | 6/2011 | Briere | G06F 16/958 709/204 |
| 8,078,719 | B2 * | 12/2011 | Etelapera | H04M 3/58 709/227 |
| 8,166,176 | B2 * | 4/2012 | Kumar | H04L 65/1016 709/227 |
| 8,181,226 | B2 | 5/2012 | Lohr | |
| 8,380,859 | B2 * | 2/2013 | Chaturvedi | H04L 67/14 709/224 |
| 8,473,577 | B2 | 6/2013 | Chan | |
| 8,764,555 | B2 * | 7/2014 | Quan | A63F 13/49 463/24 |
| 8,850,037 | B2 * | 9/2014 | McDonough | H04L 67/148 709/227 |
| 9,043,488 | B2 * | 5/2015 | Chaturvedi | H04L 63/0807 709/227 |
| 9,106,509 | B2 * | 8/2015 | Chaturvedi | H04L 65/1069 |
| 9,106,721 | B2 * | 8/2015 | Quan | H04L 67/26 |
| 9,112,885 | B2 * | 8/2015 | Chan | H04L 67/1095 |
| 9,172,703 | B2 * | 10/2015 | Chaturvedi | H04L 61/2575 |
| 9,210,268 | B2 * | 12/2015 | Chaturvedi | H04M 3/56 |
| 9,292,367 | B2 * | 3/2016 | Mickens | G06F 9/544 |
| 9,380,123 | B2 * | 6/2016 | Linn | H04L 67/20 |
| 9,413,758 | B2 * | 8/2016 | McDonough | H04L 63/0853 |
| 9,413,854 | B1 * | 8/2016 | Bellingan | H04L 67/10 |
| 9,507,630 | B2 * | 11/2016 | Addepalli | G06F 9/4856 |
| 9,614,922 | B2 * | 4/2017 | Limburn | H04W 4/023 |
| 9,769,265 | B2 * | 9/2017 | Yano | H04L 67/148 |
| 10,089,280 | B1 * | 10/2018 | Knas | H04L 65/4069 |
| 10,187,770 | B2 * | 1/2019 | Krochmal | H04L 67/22 |
| 10,193,987 | B2 * | 1/2019 | Linn | G06F 9/4856 |
| 10,237,711 | B2 * | 3/2019 | Linn | H04L 67/22 |
| 10,681,182 | B1 * | 6/2020 | Karras | G06F 16/951 |
| 2003/0046342 | A1 * | 3/2003 | Felt | H04L 67/1029 714/15 |
| 2003/0055977 | A1 * | 3/2003 | Miller | H04L 67/14 709/227 |
| 2003/0088676 | A1 * | 5/2003 | Smith | H04L 63/0414 709/227 |
| 2003/0154398 | A1 * | 8/2003 | Eaton | G06Q 30/08 709/227 |
| 2003/0195963 | A1 * | 10/2003 | Song | H04L 67/142 709/227 |
| 2004/0068567 | A1 * | 4/2004 | Moran | H04L 67/14 709/227 |
| 2004/0143600 | A1 * | 7/2004 | Musgrove | G06F 16/24575 |
| 2005/0033843 | A1 * | 2/2005 | Shahi | G06F 16/957 709/228 |
| 2006/0122922 | A1 * | 6/2006 | Lowenthal | G06Q 20/108 705/42 |
| 2007/0003919 | A1 * | 1/2007 | Stevenson | G09B 19/0038 434/350 |
| 2007/0011496 | A1 * | 1/2007 | Ahmad | G06F 30/00 714/39 |
| 2007/0054627 | A1 * | 3/2007 | Wormald | G06F 9/4856 455/70 |
| 2007/0094490 | A1 * | 4/2007 | Lohr | H04L 67/14 713/153 |
| 2007/0209038 | A1 * | 9/2007 | Fuchs | G06Q 30/06 719/313 |
| 2009/0063690 | A1 * | 3/2009 | Verthein | H04L 67/14 709/228 |
| 2009/0132500 | A1 * | 5/2009 | Jones | G06F 16/957 |
| 2009/0204966 | A1 * | 8/2009 | Johnson | H04L 67/36 718/100 |
| 2009/0271238 | A1 * | 10/2009 | Himley | G06Q 10/10 705/325 |
| 2012/0096069 | A1 * | 4/2012 | Chan | G06F 9/4856 709/203 |
| 2013/0275494 | A1 * | 10/2013 | Gordon | H04L 67/1095 709/203 |
| 2014/0032648 | A1 * | 1/2014 | Yasaki | H04L 67/42 709/203 |
| 2014/0279573 | A1 * | 9/2014 | Coats | G06Q 30/0278 705/306 |
| 2014/0282257 | A1 * | 9/2014 | Nixon | H04L 67/18 715/835 |
| 2015/0180984 | A1 * | 6/2015 | Poletto | G06F 12/1072 709/203 |
| 2015/0373084 | A1 * | 12/2015 | Krochmal | H04L 67/22 709/217 |
| 2016/0029153 | A1 * | 1/2016 | Linn | H04W 4/80 455/41.1 |
| 2016/0055490 | A1 * | 2/2016 | Keren | G06F 16/951 705/14.47 |
| 2016/0092442 | A1 * | 3/2016 | Gillett | G06F 21/6218 707/608 |
| 2016/0173617 | A1 * | 6/2016 | Allinson | H04L 67/02 709/227 |
| 2017/0048170 | A1 * | 2/2017 | Smullen | H04L 67/02 |
| 2017/0161347 | A1 * | 6/2017 | Raza | H04L 67/42 |
| 2017/0212771 | A1 * | 7/2017 | Weissberg | G06F 3/04845 |
| 2017/0289188 | A1 * | 10/2017 | Shaikh | H04L 61/2007 |
| 2018/0109955 | A1 * | 4/2018 | Nixon | H04M 1/72472 |
| 2018/0212904 | A1 * | 7/2018 | Smullen | H04L 63/18 |

* cited by examiner

MULTI-DEVICE WORK FLOW MANAGEMENT METHOD AND SYSTEM FOR MANAGING WORK FLOW DATA COLLECTION FOR USERS ACROSS A DIVERSE SET OF DEVICES AND PROCESSES BY UNIFYING THE WORK PROCESS TO BE DATA AND DEVICE AGNOSTIC

CROSS-REFERENCE TO RELATED APPLICATION(S)

This application is a divisional of U.S. patent application Ser. No. 15/479,178 filed on Apr. 4, 2017, which claims priority to U.S. Provisional Patent Application No. 62/319,057 filed on Apr. 6, 2016, both of which are hereby incorporated by reference in their entireties.

TECHNICAL FIELD

This application relates to unifying work process data collection in a wide area network comprised of diverse user devices. More specifically, the application relates to systems and methods for managing work flow data collection for users across a wide area network comprising a diverse set of devices and processes and unifying the work process to be data and device agnostic.

BACKGROUND

In the post-internet world, users increasingly rely on different electronic channels for communication. For example, users and customers accessing resources of an enterprise system often transition between devices to access enterprise resources, such as applications and data intakes, whereby the user or customer switches between a first mobile device, a second mobile device, a desktop computer, and/or a personal computer (e.g., workstation or laptop computer). Tasks that are started on one device can be completed on a different device. But since the increase on reliance on multi-channel access, many technical challenges have been identified. For instance, users that begin to enter data on a first device cannot simply continue a work process they already started on the first device using a different device, mostly due to differences in the operational and/or technological characteristics between devices. A user may have different devices, such as a mobile phone and a desktop computer, each having different operating systems, such as Apple iOS® and Microsoft Windows®, or the devices may have different display sizes (e.g., mobile phone screen, desktop monitor) and different input devices (e.g., touchscreen inputs, microphone, mouse, keyboard). To permit access to from the various devices, a variety of channels are established to service the disparate devices. However, the components of these channels are usually configured and/or programmed to service particular devices or programs. The functionality of a device being used may behave differently depending upon the input channel or device the user is using to access the work flow or functionality (e.g., web-based portal, mobile web-portal, mobile application). The backend processes for each type of device and channel are typically designed to be device and/or channel specific, so seamlessly switching between platforms is not always practical.

Conventional systems may provide work flow applications to customers through a variety of channels accessible to particular devices (e.g., mobile devices, desktops, laptops, tablets) and software. These multiple channels provide customers with the flexibility of accessing work flow processes, such as applying for loans, purchasing different services, or opening accounts, through the various channels. In many cases, customers may want to start a multi-step process in one channel (e.g., home computer and web browser) and then continue the process using a different channel (e.g., smartphone and mobile application). Although conventional systems and methods might allow customers to access processes through various different channels, customers using conventional systems and methods are frequently unable to continue the same ongoing process-instance, continuing from the same process step where the customer switched from one device and channel to the next. Additionally, the user's experience may be significantly different between devices or channels. This is often because host servers typically execute different, distinct processes that are custom tailored for each respective device or channel, making it difficult (if not infeasible) to continue an ongoing process when a user changes the device and/or channel. Not only does this make it difficult to continue the same process between devices, but it often requires engineers and developers to generate or modify processes for each channel or device implementation for a particular process when the process is changed or otherwise updated.

Moreover, conventional systems and methods often host or otherwise execute software applications that provide streamlined processes to simplify customer interaction (e.g., populate data fields with inputs from previously supplied data). These processes may be insufficient for service representatives' needs. What is needed therefore is the capability for user or representative to start a streamlined process and continue it in a full-feature process (i.e., without limiting the features available to the user or representative workstation due to the need to tailor a process for multi-channel interactions). Furthermore, it may be costly and difficult to deliver and support enterprise applications on each of the channels and devices because of the demands associated with tailoring or otherwise developing solutions for facilitating multi-channel access to particular processes; particularly, when the enterprise applications are not configured natively for interoperability with other applications or the variety of possible channels and devices. Costs can also mount as additional adaptations or modifications are required when the system or aspects of the system are upgraded. Furthermore, there may be instances where a customer service representative working at a workstation needs to interface with a user on a mobile device. The representative may need to simulate the user's different channel experience so they can understand what the user is going through and see how the user is viewing the information. Therefore a need exists to create a flexible work flow that is device independent.

SUMMARY

Accordingly, what is needed is a system and method that allows users to change channels (different devices) during a work flow and continue completing the work flow experience from the user's last position regardless of channel. Also needed is a work flow process that can be defined once and reused on multiple devices or channels and that allows service representatives to easily request information (e.g., supporting documents) and customer actions (e.g., electronic signatures). The desired system should also be able to utilize device-specific capabilities, such as location and camera devices on mobile devices, to enhance the user experience by reducing user effort. Further, the system should be able to optimize the customer experience and provide an alternate data intake process work flow that may be mapped to a more feature rich flow.

Disclosed herein are systems and methods intended to address the shortcomings in the art and may provide additional or alternative advantages as well. Embodiments disclosed herein may allow a single process having multiple steps to be retrieved and continued across multiple channels and devices with apparent continuity to the end-user. The status of each process step is tracked and the inputs are stored, providing the system with the requisite information when users continue processes on a different channel or device from the original channel or device. The system may host and execute processes that may be presented and manipulated across the various channels and devices, but without requiring engineers and developers to write or otherwise tailor software applications and network configurations to facilitate or allow multi-channel interactions. The present systems and methods support continuation of user experience from a user's latest position, as the user moves from channel-to-channel and/or device-to-device. The systems and methods provide an enterprise reusable framework for one or more data intake fields and personalization of experience (e.g., activities change based on what the components of the system dynamically detect/learn about the customer or device). Advantageously, the embodiments described herein may reduce costs to the hosting enterprise system, deliver faster service, and provide similar capabilities across current and potential new channels and/or device, thereby providing a consistent look-and-feel.

The present methods and systems allow the user to change devices while interacting with the enterprise system and particular data intake processes (e.g., start a process online using a first device and then contact a member service representative (MSR) using a different device without losing information inputted). The present system and method allow the user to seamlessly continue with the process (e.g., data intake process/application). The system may reuse the user inputs/information on multiple devices, allow the MSR or backend systems to easily request or query information (e.g., supporting documents) and customer actions (e.g., electronic signatures), and utilize device-specific capabilities (e.g., location, camera) that may enhance customer experience.

In an embodiment, a computer-implemented method comprises receiving, by a computer, from a first client device, data corresponding to an execution of one or more instructions, wherein the instructions are generated and transmitted to the first client device by the computer, wherein the one or more instructions are associated with a data intake process; updating, by the computer, a data record of an instance to include the data received from the first client device, the data record of the instance associating one or more instructions with the data received from the first client device corresponding to each of the one or more instructions; determining, by the computer, a progress value corresponding to the updated instance, wherein the progress value corresponds to a status of a most recent instruction received from the first client device in relation to one or more steps within data intake hierarchy of the data intake process associated with a first presentation flow, wherein the first presentation flow corresponds to a display screen associated with the first client device displaying steps within the data intake process; upon receiving a notification that the instance is associated with a second client device, preventing, by the computer, the instance to be updated by data received from the first client device; determining, by the computer, a second presentation flow corresponding to a display screen associated with the second client device displaying steps within the data intake process, wherein the first client device has a different presentation flow than the second client device; transmitting, by the computer, to the second client device, a graphical user interface configured to display on the second client device and configured to receive additional data corresponding to an additional instruction of the instance, wherein the display is customized based on the second presentation flow corresponding to the display screen associated with the second client device and the progress value corresponding to the updated instance; receiving, by the computer, from the second client device, additional data corresponding to the additional instructions; and updating, by the computer, the data record of the instance with the additional data.

In another embodiment, a computer system comprises a server, which is configured to receive from a first client device, data corresponding to an execution of one or more instructions, wherein the instructions are generated and transmitted to the first client device by the computer, wherein the one or more instructions are associated with a data intake process; update a data record of an instance to include the data received from the first client device, the data record of the instance associating one or more instructions with the data received from the first client device corresponding to each of the one or more instructions; determine a progress value corresponding to the updated instance, wherein the progress value corresponds to a status of a most recent instruction received from the first client device in relation to one or more steps within data intake hierarchy of the data intake process associated with a first presentation flow, wherein the first presentation flow corresponds to a display screen associated with the first client device displaying steps within the data intake process; upon receiving a notification that the instance is associated with a second client device, prevent the instance to be updated by data received from the first client device; determine a second presentation flow corresponding to a display screen associated with the second client device displaying steps within the data intake process, wherein the first client device has a different presentation flow than the second client device; transmit to the second client device, a graphical user interface configured to display on the second client device and configured to receive additional data corresponding to an additional instruction of the instance, wherein the display is customized based on the second presentation flow corresponding to the display screen associated with the second client device and the progress value corresponding to the updated instance; receive from the second client device, additional data corresponding to the additional instructions; and update the data record of the instance with the additional data.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the invention. The present disclosure can be better understood by referring to the following figures. The components in the figures are not necessarily to scale, emphasis instead being placed upon illustrating the principles of the disclosure.

DETAILED DESCRIPTION

The present disclosure described herein reference potential embodiments illustrated in the drawings. Other embodiments or changes to embodiments may be used, made, or described herein, without departing from the spirit or scope of the present disclosure. It should be appreciated that the illustrative embodiments described in the detailed description are not meant to be limiting of the subject matter presented here. Reference made to the exemplary embodiments illustrated in the drawings, and the specific language used herein to describe the same, are not necessarily intended as limitations of the scope of this disclosure. Alterations and further modifications of the inventive features illustrated and described herein, and additional applications of the principles of the subject matter of the disclosure, occurring to one skilled in the relevant art and having possession of this disclosure, should be considered within the scope of the disclosure.

Data intake process (DIP) continuation allows the user to optionally continue a data intake process on another channel/device. Internally to the multi-channel experience management, this will create a new copy of the data intake process suitable to the new channel/device. In some implementations, the copy allows another user (possibly a MSR) to continue from where the originating user left off in the data intake. While certain embodiments of the present disclosure is illustrated as a DIP, it is expressly understood that present invention is not limited to DIP or processes including data intakes. The present disclosure may be applied to any business process or modular display of any user interface.

Figure 1:
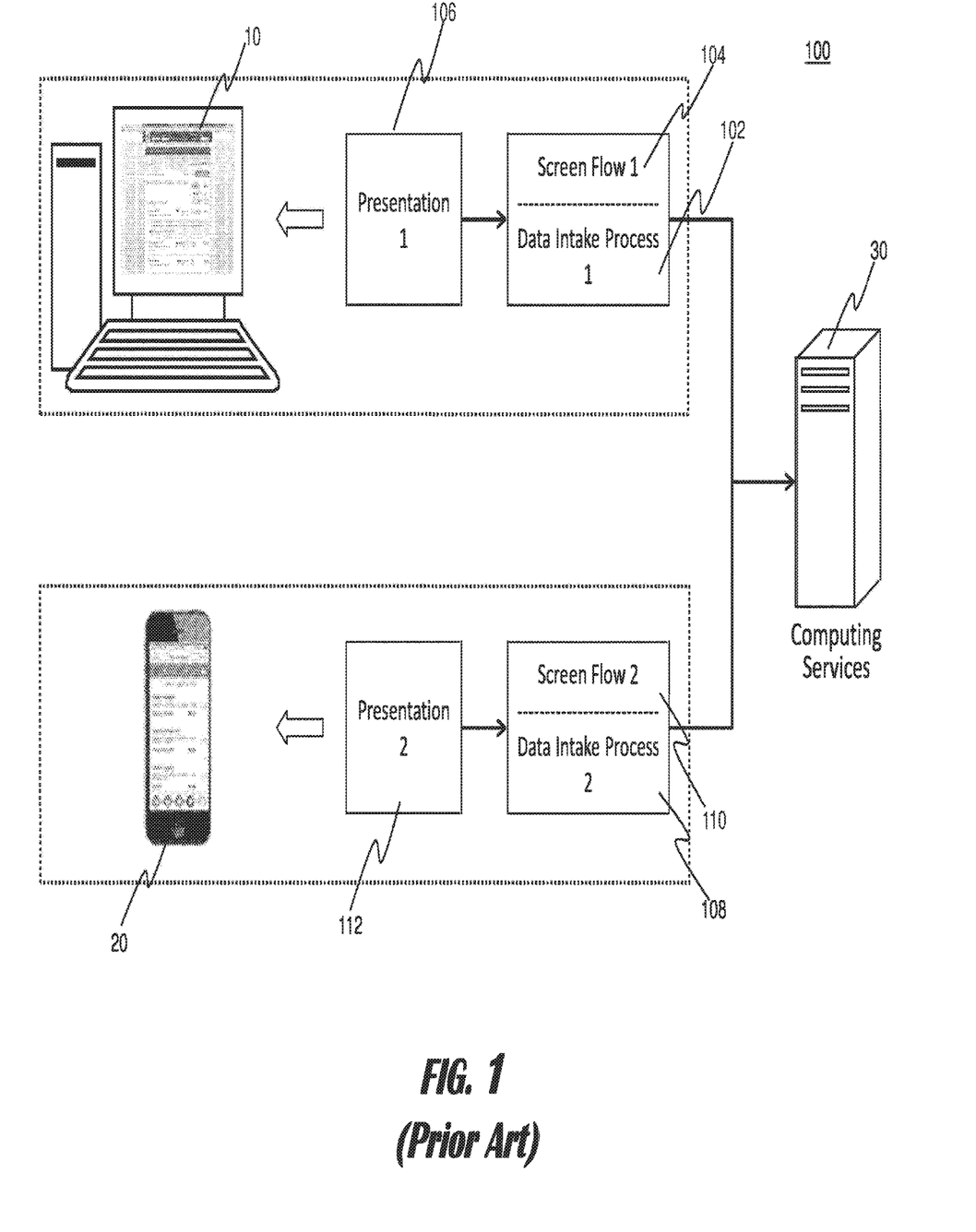
FIG. 1 depicts a work flow system in the prior art where different processes, presentations and flows are required based on device.

FIG. 1 is an illustration of a prior art system 100 showing data flow among components of conventional system 100. System 100 is configured to take a conventional approach to handling multi-channel processes, whereby a different process or activity is presented on each device. As illustrated, data intake process 1 102 with associated screen flow 1 104 is presented on device 10 via presentation 1 106. Similarly, data intake process 2 108 with associated screen flow 2 110 is presented to device 20 utilizing presentation 2 112. As will be understood, the overall data intake process may be for the same task, such as applying for the same services, but because of the limitations of prior art system 100, each device or channel 10 and 20 requires different data intakes, screen flows and presentation to be created, stored, accessed and generated from the computing services 30. Computing services 30 may be any host, server, cloud based server, proprietary server, SaaS, or local device coupled over a network.

These necessary differences between processes, screen flows and presentations may be a result of the differences in channels of delivery or device limitations. For example, device 10 may accommodate delivery of a full page of information related to the data intake process 1 102, whereas device 20, with its associated smaller screen may only be able to accommodate one-quarter of the information at a time. Because of this limitation, data intake process 2 108 and presentation 2 112 required for device 20 may not be suitable if the user stops in the middle of inputting data and switches to device 10. As a result, data intake process 1 102 may need to be restarted on device 10 and the information already input via device 20 may be lost or may not be compatible with the new instance of the process. Furthermore, the process described in FIG. 1 may require high processing power and storage capability from computing service 30 (e.g., storage of presentation 1 106 and presentation 2 112, storage of screen flow 1 104 and screen flow 2 110, and determining which presentation or which screen flow to display). Additionally, in system 100, each data intake process must be duplicated, modified and stored for each potential channel. This results in large storage capacity, large engineering efforts to maintain instances for each channel and results in differences for each data intake process between channels. For example, if the data intake process is applying for a service, instances of the very same process need to be maintained for numerous operating systems, numerous devices, and for numerous configuration. As a result, there are potentially hundreds of instances for each data intake process necessary to ensure that a process is available to a user of a specific channel and device. This leads to inconsistencies, errors and inefficiencies in the creation, maintenance and storage of each data intake.

Figure 2:
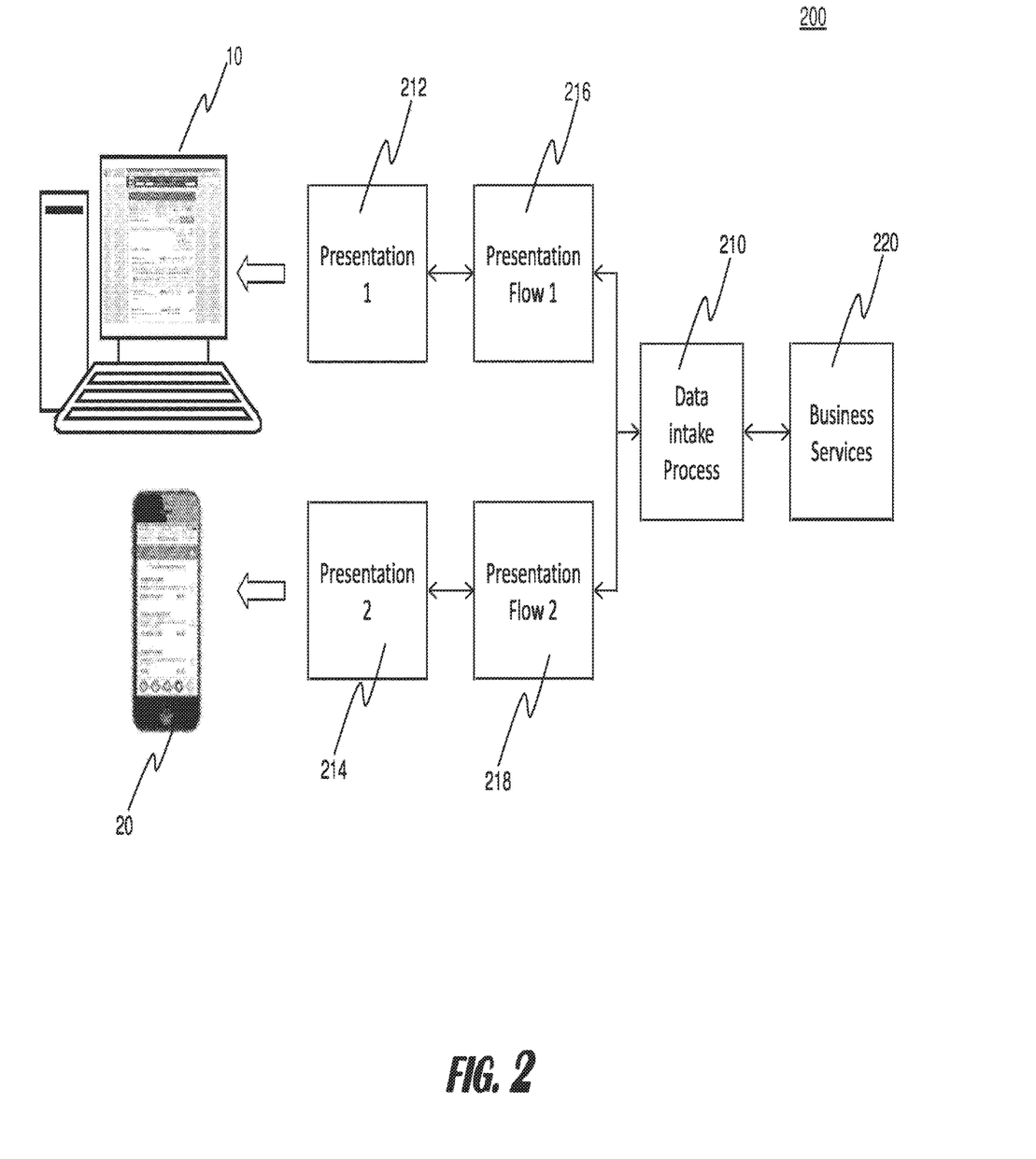
FIG. 2 depicts an embodiment of the present disclosure utilizing a single data intake process for multiple devices according to an exemplary embodiment.

FIG. 2 illustrates system 200 in an embodiment of the present disclosure. System 200 utilizes the same data intake process 210 to provide different presentations 212, 214 to channels 10 and 20 utilizing two different presentations 212, 214 based on the channel characteristics for devices 10 and 20. As illustrated in FIG. 2, the same service 220 can be presented to a user on different channels utilizing the same data intake process 210 to ensure that the user has the same experience regardless of the channel. Because the user is interacting with the same data intake process 210, the user will be able to switch between channels 10 and 20 without a loss of continuity or data. That is, the overall information required for the data intake process 210 is the same regardless of channel and the process remains consistent, even though the presentation flow 216, 218 is different. As the user inputs information on device 20, the information is conveyed to the service 220 regardless of the channel. Because of this, a user that does not complete the task will be able to resume the data intake process 210 on device 10 and still have access to the same data intake process 210 and the information already saved and entered to the service 220. In this manner, any information the user input via the first channel 10 will be available to the user via the second channel 20. This reduces storage requirements on the systems and servers because information of user profile information is not needed to be associated with each data intake process 210 required for each channel. Additionally, because data intake process 210 are channel independent, system 200 is able to reduce the number of data intake process 210 it must store and maintain. Further, the fact that the data intake process 210 itself is channel agnostic allows the channel characteristics to be controlled based on the presentation flow side of the system, which may be in communication with the device.

System 200 is no longer required to maintain multiple instances of the same data intake process 210 for each channel. This improves continuity between data intakes and reduces the number of versions required for each process. Furthermore, since only a single process is required, the amount of storage for both the data and the process is greatly reduced, resulting in faster and more accurate record and data retrieval. The user's experience is further enhanced, as the user will not need to enter data multiple times based on the user's current channel of access.

Figure 3:
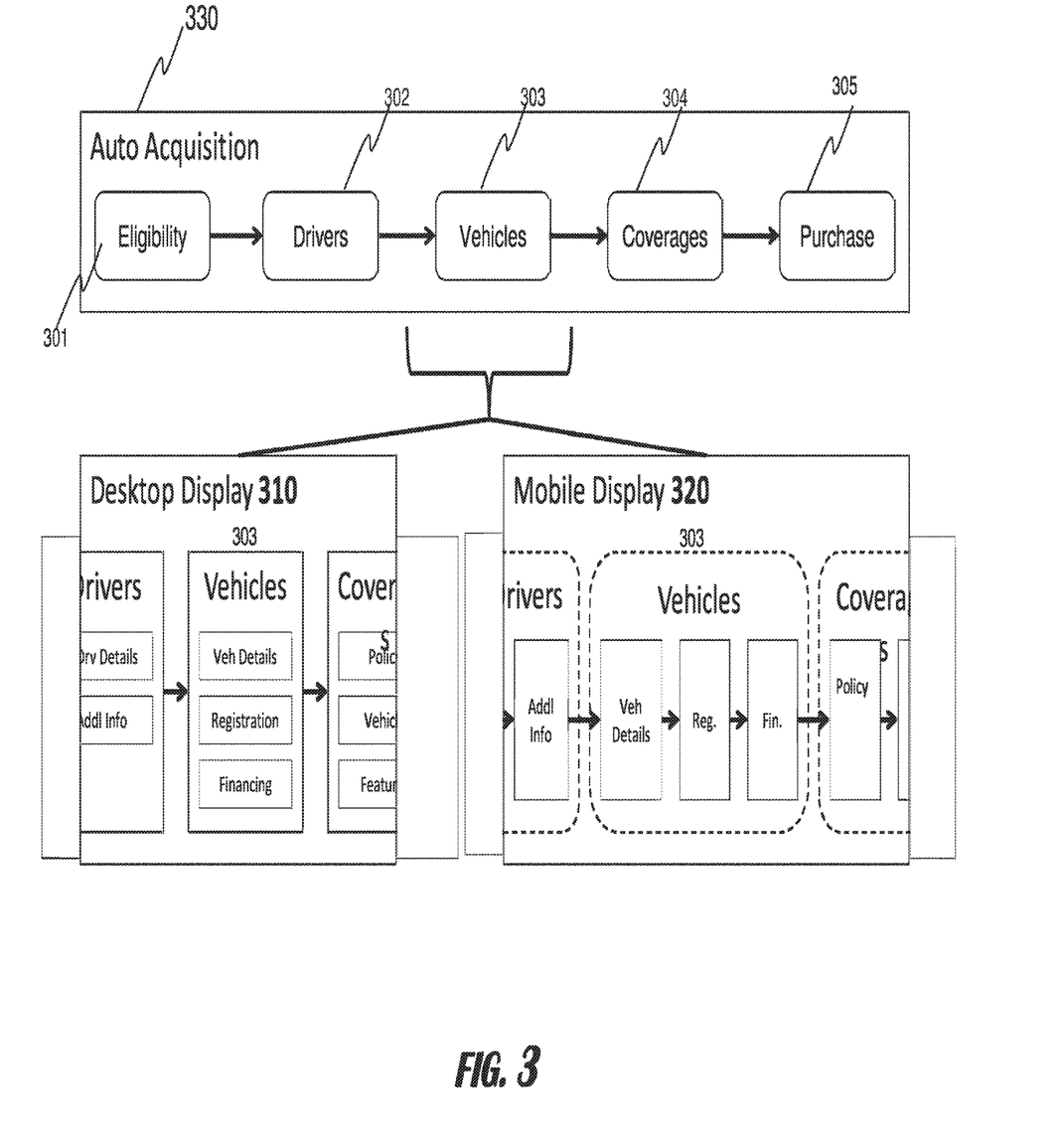
FIG. 3 depicts a data intake process form and the presentation flow and how it might be depicted differently on various devices according to an exemplary embodiment.

FIG. 3 depicts a sample of various displays in an embodiment of the present disclosure. As seen in FIG. 3, display 310 may be associated with a desktop computer such as device 10 and display 320 may be a display from a mobile device such as device 20. In an embodiment, the process (e.g., data intake) shown in this figure may be generated by the system or a server associated with the system. As the user advances through the data intake process (e.g., process 330), in this case auto acquisition, from steps 301-305, the user has a similar experience regardless of the device or the channel. The process flow may be implemented by the multi-channel, experience-management system comprising any combination of hardware and software computing and networking devices that provide externalized rules for managing the process flow. These hardware and software components remove responsibilities for gathering, querying, updating, and general management of data related to an ongoing process, from the backend applications actually executing the software hosting the data intake. In this way, the components of the system understand which activity (i.e., step of a data intake) is the next step to execute, regardless of which device or channel is being used to access the particular activity.

Figure 4:
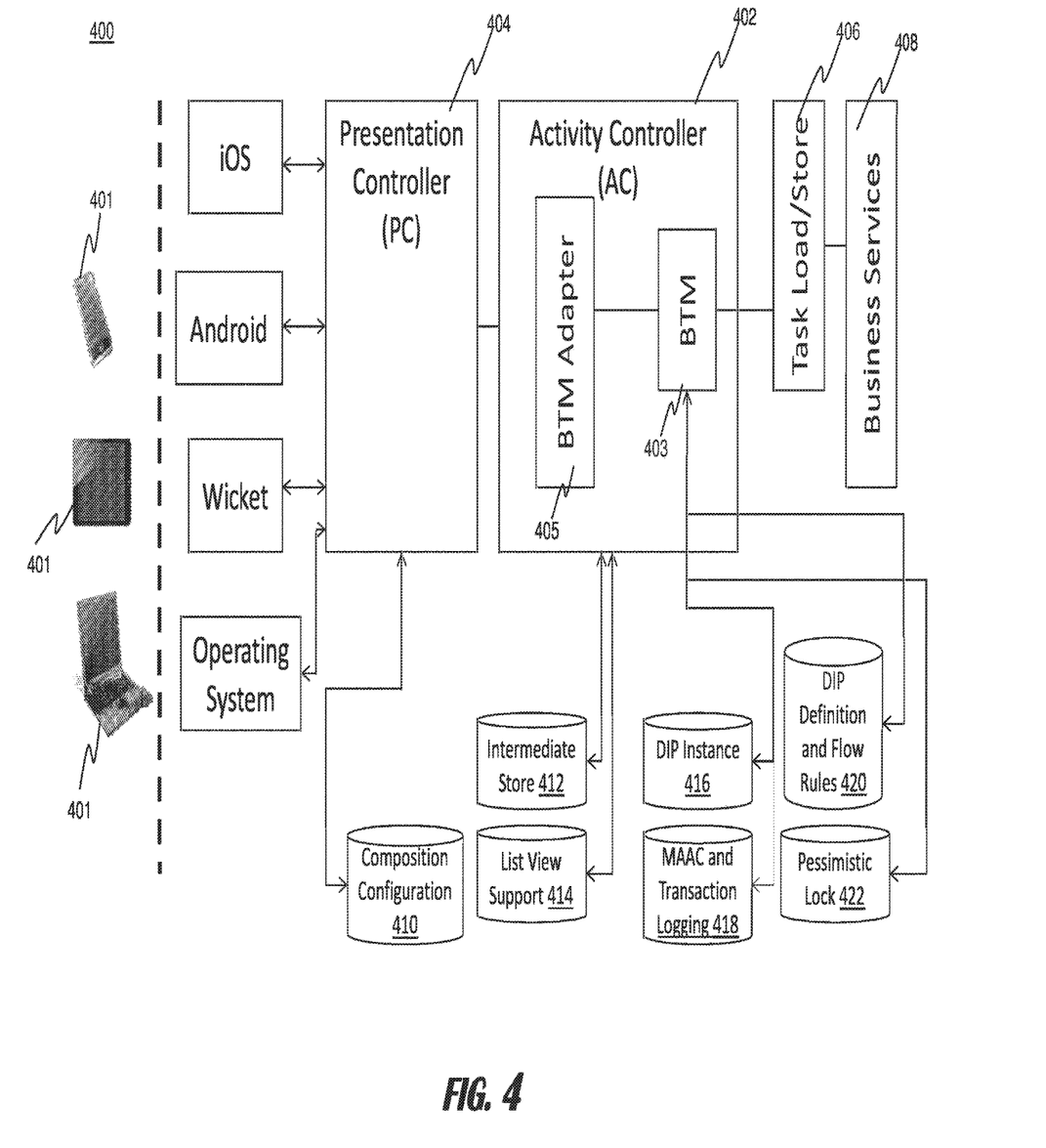
FIG. 4 depicts a system level framework for implementing the systems and methods according to an exemplary embodiment.

FIG. 4 depicts system 400 in an embodiment of the present disclosure. System 400 comprises, Activity controller 402, which includes Task Manager (TM) 403 and BTM adaptor 405. Activity controller 402 within the multi-channel experience management system manages the status (complete vs. incomplete) and condition (ready, not ready due to incomplete prerequisites) of each activity for a given DIP instance.

System 400 further comprises presentation controller 404, task/load store 406, services server 408. System 400 may be coupled to one or more databases, servers, storage devices or memory locations, including composition configuration 410, intermediate store 412, list view support 414, Data intake Process (DIP) instances 416, MAAC and transaction logger 418, DIP definition and flow rules 420 and pessimistic lock 422. As is understood in the art, one or more of these databases, servers, storage devices or memory locations may be comprised of one or more servers, computers, memories, or networks and they may be in the form of a single or multiple machines, instances, or memories. They may communicate directly or through a network and may communicate over a local area network or a wide area network. Some or all of the components may communicate through wired or wireless communication and any components may be combined into one or more sub-components.

Activity controller 402 is a service interface. Activity controller 402 tracks a user's steps and ensures that the user, when switching channels is able to reuse and reenter data at the same point in the process where the user left off. Activity reuse relates to the notion that each activity will be reusable for any channel/device although the system will allow device differences due to device capabilities (e.g., device location, camera). For example, in some cases the multi-channel experience-management framework automatically places more activities per screen for devices having more display real estate, and possibly places only one activity on a screen for devices supporting less real estate. Activity controller 402 ensures the flow of the presentation is aligned with the steps of the data intake process and that a process (e.g., a module within a DIP) is completed before a new process (e.g., module) for the user is initiated (e.g., a segment of the data intake is completed before starting a new segment). Activity controller 402 may be a server or a series of networked servers that communicate directly or over a network. Activity controller 402 may comprise BTM 403 and BTM adapter 405. BTM 403 may also track tasks or task steps and may be implemented on a server or main frame associated with the activity controller 402. BTM adapter 405 is an interface for activity controller 402 to call data intakes and to keep track of data intake. BTM adapter 405 is called from the activity controller 402 and translates it into a computer-readable format that may be utilized to feed information to the activity controller 402.

Presentation Controller 404 manages the composition of activities per desired configurations, allowing the same data intake process to be re-used in different ways. This gives the flexibility to dictate the number of activities presented based on device or user type or even user intent. Presentation controller 404 recognizes the channel that the user or service representative is utilizing and adjusts presentation accord to the channel attributes, such as screen size, operating system, etc. Presentation controller 404 may be a template or vehicle to convey content in accordance with the channel or user preferences. Presentation controller 404 maps the activity to a specific type of page configuration. While activity controller 402 ensures that the flow is aligned with the data intake, presentation controller 404, based on channel attributes, determines the display and flow of the data intake, based on the channel and device characteristics. In an embodiments, the presentation controller 404 may determine the type of the channel used by the end user and modify the presentation based on the channel.

When a data intake process is defined, a set of criteria have to be defined for the activity controller. Presentation controller 404 has the device page information for every one of those steps and maps out any variations that are desired. So, for example, for required variations for different data intakes, things may become characteristic used at runtime to decide differences based on a user type or a device type. Presentation controller 404 uses the criteria and maps out the steps in the data intake. Prior to determining configuration, presentation controller 404 receives input from the user's device. The device may be using an application on a smart phone or a browser on a web site. Based on the channel, to certain presentation decisions, e.g., small, medium and large display configurations for the data intake process are determined.

Presentation controller 404 may be a server-based set of hardware and software components configured to perform the various tasks and processes described herein. The presentation controller 404 requests or receives information from a user via the channel that the member used to contact the system 400. For example, the user may call a member service representative (MSR), who then inputs the information through an MSR computing device. The system 400 uses the information to establish configurations and control interactions with the activity controller 402 to generate a suitable graphical user interface to display to the user. For example, in an embodiment a medium-sized interaction may be requested regardless of the operating system, by a user utilizing a desktop browser. Contrastingly, a service representative may wish to receive as much information as possible, so even within the selected browser the channel may request a large experience even though the MSR may also be on a desktop computer. Presentation controller 404 will push the large configuration, based on the passed-in presentation composition code, and irrespective of the actual channel attributes.

Presentation controller 404 may be coupled directly or indirectly to composition configuration database 410. Composition configuration allows the presentation controller to manage the composition of activities per desired configurations, allowing the same DIP to be re-used in different ways. This gives the flexibility to dictate the number of activities presented based on device or user type or even user intent. Composition configuration 410 comprises groupings for a given data intake. In an embodiment, a grouping might be small (e.g., comprised of a single step for each page view). Views can be reused with different steps. A medium view might be two views on a page, so that table or groupings would map out, for a data intake, steps 1 and 2 and so on into container/module A or container/module medium. A large view might be steps 1 through 4 in a single container/module called large 1. In essence, the device page mapping is what tells the presentation controller 404 to have step 1 on page 1 for a mobile device, and steps 1-4 for a channel with a larger screen. The above-mentioned information may be stored in a computer-readable file format, which include a mapping information of different configurations for different devices. This may be due to a variety of information stored within the composition configuration 410 regarding different data intake forms. For example, a data intake form for service A may have different configurations stored in the composition configuration database 410 (e.g., if a small screen is utilized then 2 steps per screen, if a large screen is utilized, then 4 steps per screen). The client device conveys to the presentation controller 404 what kind of composition it should display. The client dictates the experience, i.e., small screen experience, medium screen experience, or super user experience. The client application needs to be capable of explicitly telling the presentation controller 404 what it wants. For example, when the client changes client devices, the device may transmit a notification (e.g., instruction) identifying the new client device. In other embodiments, an MSR may notify the system regarding the new client device. In other embodiments, the system (or a server associated with the system) may query the client device and recognize the device based on variety of device identifiers such as IP address or MAC address or other GUID's. For example, the system may query (periodically or based on receiving instructions) and determine the device (e.g., first client device or the second client device) based on the device identifiers. The system may, upon determining that the device has changed from the first client device to the second device, adjust the DIP accordingly to be displayed on the second client device. For example, the system may determine that the device has changed from a laptop to a mobile phone and will change the display accordingly. In other embodiment, the user or the MSR may transmit an instruction and notify the system that the device has changed. For example, the user may be simultaneously working on a DIP with an MSR and notify the MSR that the user desires to continue the process on his mobile device. In that embodiment, the MSR may send a notification to the system to change the client device from a laptop to a mobile device. In some other embodiments, a default mapping is stored in the composition configuration 410. For example, composition configuration 410 may dictate that a display of certain data intake process on a mobile device may include a two containers/modules per page. In that embodiment, upon detection of the user device as a mobile device, the default two-module per page will be displayed unless the user requests otherwise.

Task load/store 406 may be used to store and or load into the activity controller a common set of collected information regardless of the data intake process the user is interested in. Services 408 comprises the services offered by the system. Services 408 may include a variety of data intakes and data intake forms. For example, different business services 408 may be stored within a database and accessed by the business services 408.

The intermediate store 412 may be an immediate save that the hardware and/or software components of the multi-channel experience-management system may access and update to persist in capturing the in-progress data in an intermediate store. This is done to avoid bothering the user with validation of incomplete data. When the DIP instance is continued, the intermediate data will be presented to the user for completion. Intermediate store 412 may be coupled to the BTM adapter 405 and is used to save data as it is inputted. If a user does not complete all the steps in the data intake, the data is automatically saved to the intermediate store 412 as it is inputted. This allows a user that switches channels or resumes completing the data intake process to start and stop without having to lose or re-input data. Additionally, if a user wants to save but not submit their data they can use intermediate store 412. When a user indicates an action such as save and store, activity controller 402 will access intermediate 412 and transmit the payloads (e.g., data) but will keep the payloads available. For steps that the user was on, the user can have a mixture of incomplete data. He may input his address but not have his driver's license at the time. The system will just treat the available data as a payload and the next time the user resumes the process, the intermediate data store 412 will couple to that DIP instance so that when the user comes back to resume that instance, they will get back to the step that they were on or the steps they were on, and if there was intermediate data saved, that the data they will be presented. DIP instance may be data-agnostic and may operate regardless of the type, format, quality, or content of the data itself.

This will take precedence for the immediate resume of that saved data intake process and gives the user access to the intermediate data store 412, which may be referred to as a dirty save, because the data has not been validated by a service 408. The data may be revised and changed at this point or may be submitted, at which point it will go through a validation step and be persisted in the full system of record. In an embodiment, records are associated with members and associated member IDs. However, each data intake process has its own instance ID as well. So in an embodiment, Member A could have quotes 1, 2, 3, and 4. Each one of those quotes has their own unique identifier but they are all associated to Member A. The system will have a record with a member ID and then under that record there will be instance that are currently in works. The Association does not need to be hierarchical there must be some way to do the association.

It will be understood, that intermediate store 412 may comprise the payload that would have come through if a save action was executed. Accordingly, for every step there will be an extra set of payloads that pass through. The data will be the data that is collected for each of those steps. Intermediate data store 412 does not make a determination about the quality of the data. It is simply a placeholder to store information in the event that the user returns to that data intake process instance.

List view support 414 may be coupled to activity controller 402. List view support 414 tracks progress of a data intake process and may display to the user or service representative an indication of the progress or status. In an embodiment, the status indicator may be a tree view that shows all the steps in the data intake process and then statuses of each step. The list view support may generate an instance associated with the user's status (e.g., where the user stands within the data intake process). The instance may also identify information associated with the step (e.g., active, completed, incomplete). It may be used to track finished steps and active steps and may show which steps are contingent on other inputs.

DIP instance 416 may be coupled to activity controller 402 and the BTM 403.

DIP instance 416 stores the road map for the data being collected. It lays out each step in the process and maps the member's or user's progress, which may be stored in records for each specific DIP instance. Each user is effectively allocated their own copy of that data intake process and that is identified in DIP instance 416. For example, a user initiates a session from their mobile device to purchase a service 408. As the user completes each step, DIP instance 416 will be updated to show that the specific user has completed that step of the data intake. If the user switches channels, to a desktop, the DIP instance 416 knows exactly where the user has "left off" within the process and will make a new copy of the instance for the user to resume work. DIP mapping is sometimes necessary to have special streamlined flows (e.g., substitute vehicle) to simplify data intakes for the users. MSRs may need to continue those data intakes in a DIP, which has full capabilities. This is provided by mapping a stream-lined flow to a full featured flow based on rules which reference the activity statuses for the existing DIP and application data.

Activity controller 402 will identify the specific step and then continues from the regular routine. The presentation controller 404 will recognize the channel and determine if it can handle more steps at a time and will show those big multiple steps to the user or member.

Member Activity Across Channels (MAAC) and transaction logging 418 is used to validate if the user or service representative created an entry into the system using a portal and to optionally logs information of a user's activity across channels. Instance security ensures that when a session with the multi-channel experience management system begins, the MSR is validated using a predefined Member Activity Across Channels (MAAC) contact or authentication log or the Transaction Logging Conversation. In some implementations, an entry must have already been created using an MSR Portal. It may include appropriate process action information based on what the user did (e.g., processed, canceled, saved, abandoned). The system will also log to a table in MAAC and transaction logging 418 as a history of activities that have been processed for a given data intake process instance. An abandoned session in the multi-channel experience management system recognizes situations where the session has been abandoned by the user. It then takes action to abandon the data intake process including freeing pessimistic locks and updating MAAC logging information. In some embodiments, logging is done in the multi-channel experience management system optionally via information logs to Member Activity Across Channels (MAAC). It will automatically include appropriate process action information based on what the user did (e.g., processed, canceled, saved, abandoned). The multi-channel experience management system will also log to a Transaction Logging table as a history of activities that have been processed for a given DIP instance.

DIP definition and flow rules 420 may comprise flat files that help recognize the DIP hierarchy. The flow rules may be a specialized flat table that uses specialized syntax that defines a set of uniform rule tool that define the rule conditions and rule evaluations. For example, they control flow such as "when step 5 happens, make step 8 available." All the rules in the data intake process are mapped into tables as defined by the rules. Rule conditions are defined at the task level (i.e., business process step level), and are then mapped to a particular DIP. When the system is running, the flat files may be loaded into memory, so that particular rules are accessing information that is in memory. In some embodiments, human control defines the flow of rules defined to the multi-channel experience management system to represent the default flow. Users can alter the flow based on actions including the selection of an activity from an Activity List View. The user will be allowed to remove unwanted activities (when allowed). Additionally, the user can perform actions (e.g., Edit Vehicle, Remove Vehicle) from within Activity Data Views.

Pessimistic lock 422 may be implemented as an instance on a server or database and is used when the data intakes require a lock to keep or prevent others from using or keying in on the same user at the same time. In this manner, pessimistic lock 422 may be used to prevent a user from entering information while a service representative is accessing the same information. Pessimistic lock 422 is used to indicate that there are certain tasks in progress. This ensures that any time one of the data intakes is initiated, through the activity controller 402 via BTM 403, BTM 403 first verifies if there is a lock for the user for the requested information. This prevents a situation where a service representative and a user are both entering information and data at the same time which may impact the result of the data intake. Pessimistic lock 422 is a safeguard put in place to prevent duplicative data entry and to lock a process in place once the data intake process is initiated. Once a data intake process is completed (e.g., done), saved, or exited, system 400 via activity controller 402 will release the locks so a new data intake process can be initiated for that user. The multi-channel experience management system may establish user profiles based on information about the user, customer, and transaction. Applications can acquire pessimistic locks. For ARP applications, this uses the ARP Infrastructure Lock Utility. The multi-channel experience management system can free these locks when the DIP is completed, canceled, saved, or abandoned.

Figure 5:
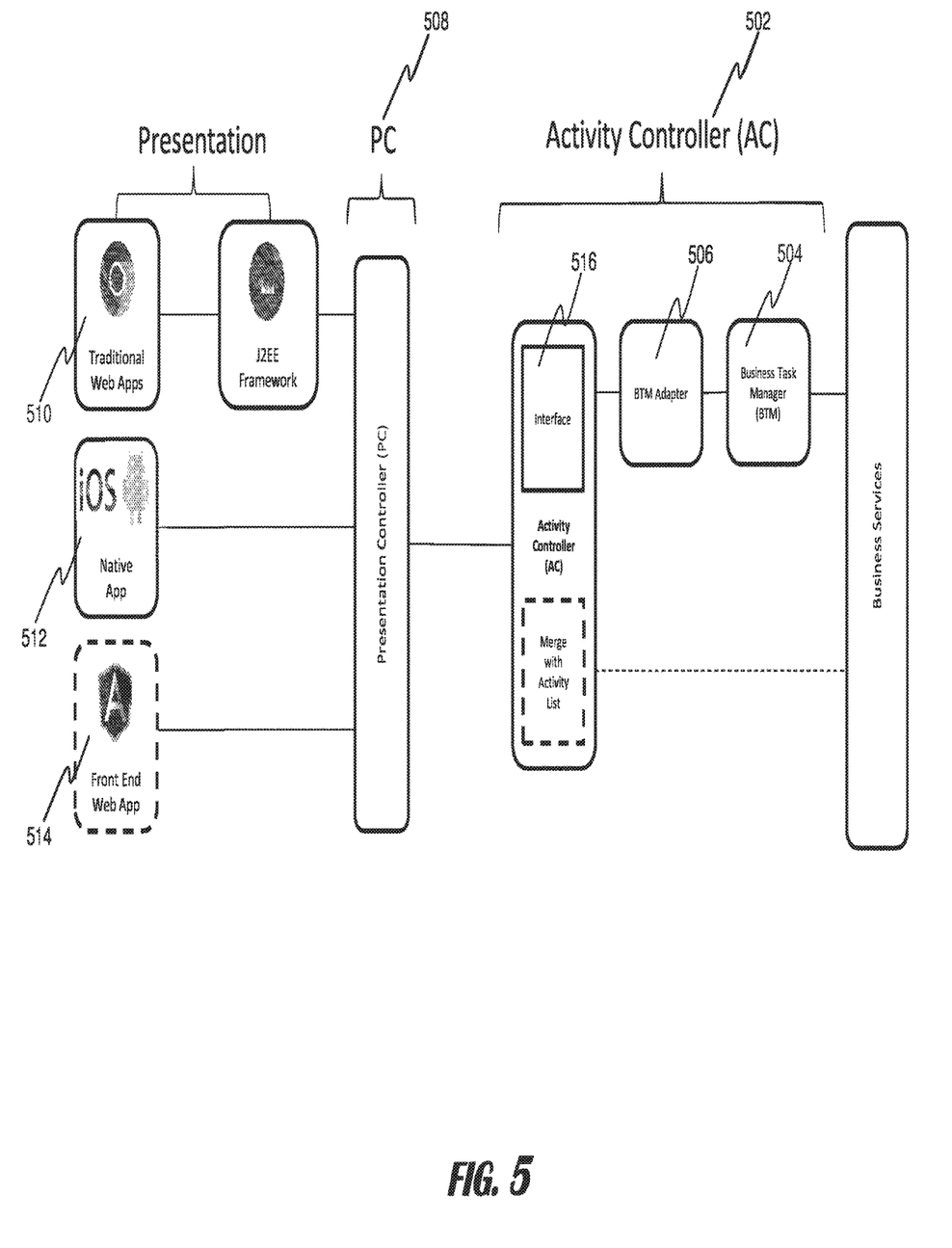
FIG. 5 depicts the various frame work tiers for implementing the systems and methods according to an exemplary embodiment.

FIG. 5 (in conjunction with FIG. 4) depicts the framework tiers in an embodiment of the present disclosure. As depicted activity controller 502 as previously discussed may comprise the BTM 504 and BTM Adapter 506. Activity controller 502 interfaces with the presentation controller 508. Devices may run traditional web apps 510, Java® or Java2® presentation apps, native apps 512 running on iOS® or android or other mobile operating systems and front end web apps 514. The web apps 510 and interfaces 516 may be resident on a single device or may be distributed across several devices (e.g., the front ends, interface with presentation controller 508). As explained previously, in an embodiment, the front end devices running a client may convey certain specific device attributes to the presentation controller 508 in an effort to ensure that they receive the proper presentation flow of the requested data intake. For example, a mobile device needs to identify via the presentation controller 404 that it has a small display screen. In response the presentation controller 508 with control process such that only one or two steps are presented on the display with each page view. In contrast, if the device identified itself as comprising a large screen, then the presentation controller 508 could display or push multiple steps at a time to the user's device. The conveyance of the specific device attributes is done via the exposed presentation controller 508 APIs. The APIs allow for the presentation composition attributes to be passed in order for the presentation controller 508 to vary its display of page views.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

We claim:

1. A computer system comprising:
one or more processors; and
one or more memories storing instructions that, when executed by the one or more processors, cause the system to perform a process comprising:
identifying a first type of client device and a second type of client device accessing a webserver;
generating one or more graphical user interfaces configured for display on the first type of client device and the second type of client device, each graphical user interface configured to receive output data corresponding to an instruction of an instance table, the instance table comprising a set of one or more instructions and a set of one or more output data corresponding to the one or more instructions in the set of instructions respectively;
transmitting, to the first type of client device and the second type of client device, the one or more graphical user interfaces configured to display on a first display on the first type of client device and a second display on the second type of client device and configured to receive additional data corresponding to an additional instruction of the instance table, wherein the first and the second display is customized based on a presentation flow corresponding to a display screen associated with the first type of client device and the second type of client device and a progress value corresponding to an updated instance;
updating the instance table according to output data corresponding to at least one instruction received from a graphical user interface configured for the first type of client device; and
updating the instance table according to output data corresponding to at least one instruction received from a graphical user interface configured for flail the second type of client device.

2. The computer system of claim 1, wherein the graphical user interface is associated with a data intake process.

3. The computer system of claim 1, wherein the second type of client device is a mobile device.

4. A computer-implemented method comprising:
identifying a first type of a client device accessing a webserver;
identifying a second type of the client device accessing the webserver;
generating a first graphical user interface configured for display on the first type of the client device;
generating a second graphical user interface configured for display on the second type of the client device, wherein the first and the second graphical user interfaces are configured to receive output data corresponding to an instruction of an instance table, the instance table comprising a set of one or more instructions and a set of one or more output data corresponding to the one or more instructions in the set of instructions respectively;
transmitting, to the first type of the client device, the first graphical user interface configured to display on a first display on the first type of the client device and configured to receive additional data corresponding to an additional instruction of the instance table, wherein the first display is customized based on a first presentation flow corresponding to a first display screen associated with the first type of the client device and a progress value corresponding to an updated instance;
transmitting, to the second type of the client device, the second graphical user interface configured to display on a second display on the second type of the client device and configured to receive additional data corresponding to an additional instruction of the instance table, wherein the second display is customized based on a second presentation flow corresponding to a second display screen associated with the second type of the client device and the progress value corresponding to the updated instance;
updating the instance table according to output data corresponding to at least one instruction received from the first graphical user interface configured for the first type of the client device; and
updating the instance table according to output data corresponding to at least one instruction received from the second graphical user interface configured for the second type of the client device.

5. The computer-implemented method of claim 4, further comprising:
receiving, from the first type of the client device, data corresponding to an execution of one or more instructions of an application service, wherein the one or more instructions are generated and transmitted to the first type of the client device, wherein the one or more instructions are associated with a data intake process corresponding to the application service.

6. The computer-implemented method of claim 4, further comprising:
determining the progress value corresponding to the updated instance, wherein the progress value corresponds to a status of a most recent instruction received from the first type of the client device in relation to one or more steps within data intake hierarchy of a data intake process associated with the first presentation flow, wherein the first presentation flow corresponds to the first display screen associated with the first type of the client device displaying steps within the data intake process.

7. The computer-implemented method of claim 4, further comprising:
determining the second presentation flow corresponding to the second display screen associated with the second type of the client device displaying steps within a data intake process, wherein the first type of the client device has a different presentation flow than the second type of the client device based on a size of the first display screen and an operating system of the second type of the client device.

8. The computer-implemented method of claim 4, further comprising:
receiving a second device identifier associated with the second type of the client device.

9. The computer-implemented method of claim 4, further comprising:
querying a first device identifier associated with the first type of the client device; and
querying a second device identifier associated with the second type of the client device.

10. The computer-implemented method of claim 9, wherein the second device identifier associated with the second type of the client device corresponds to the second display screen associated with the second type of the client device.

11. The computer-implemented method of claim 4, further comprising:
receiving a first device identifier associated with the first type of the client device.

12. The computer-implemented method of claim 4, further comprising:
receiving, from the second type of the client device, additional data corresponding to the additional instruction.

13. A non-transitory computer-readable medium storing a set of instructions executable by a processor to cause a computer to:
identify a first type of a client device accessing a webserver;
identify a second type of the client device accessing the webserver;
generate a first graphical user interface configured for display on the first type of the client device;
generate a second graphical user interface configured for display on the second type of the client device, wherein the first and the second graphical user interfaces are configured to receive output data corresponding to an instruction of an instance table, the instance table comprising a set of one or more instructions and a set of one or more output data corresponding to the one or more instructions in the set of instructions respectively;
transmit, to the first type of the client device, the first graphical user interface configured to display on a first display on the first type of the client device and configured to receive additional data corresponding to an additional instruction of the instance table, wherein the first display is customized based on a first presentation flow corresponding to a first display screen associated with the first type of the client device and a progress value corresponding to an updated instance;
transmit, to the second type of the client device, the second graphical user interface configured to display on a second display on the second type of the client device and configured to receive additional data corresponding to an additional instruction of the instance table, wherein the second display is customized based on the second presentation flow corresponding to a second display screen associated with the second type of the client device and the progress value corresponding to the updated instance;

update the instance table according to output data corresponding to at least one instruction received from the first graphical user interface configured for the first type of the client device; and update the instance table according to output data corresponding to at least one instruction received from the second graphical user interface configured for the second type of the client device.

14. The non-transitory computer-readable medium of claim 13, wherein the instructions executable by the processor further cause the computer to:

receive, from the first type of the client device, data corresponding to an execution of one or more instructions of an application service, wherein the one or more instructions are generated and transmitted to the first type of the client device by the computer, wherein the one or more instructions are associated with a data intake process corresponding to the application service.

15. The non-transitory computer-readable medium of claim 13, wherein the instructions executable by the processor further cause the computer to:

determine the progress value corresponding to the updated instance, wherein the progress value corresponds to a status of a most recent instruction received from the first type of the client device in relation to one or more steps within data intake hierarchy of a data intake process associated with the first presentation flow, wherein the first presentation flow corresponds to the first display screen associated with the first type of the client device displaying steps within the data intake process.

16. The non-transitory computer-readable medium of claim 13, wherein the instructions executable by the processor further cause the computer to:

determine the second presentation flow corresponding to the second display screen associated with the second type of the client device displaying steps within a data intake process, wherein the first type of the client device has a different presentation flow than the second type of the client device based on a size of the second display screen and an operating system of the second type of the client device.

17. The non-transitory computer-readable medium of claim 13, wherein the instructions executable by the processor further cause the computer to:

receive a device identifier associated with the second type of the client device.

18. The non-transitory computer-readable medium of claim 13, wherein the instructions executable by the processor further cause the computer to:

query a first device identifier associated with the first type of the client device; and query a second device identifier associated with the second type of the client device.

19. The non-transitory computer-readable medium of claim 18, wherein the second device identifier associated with the second type of the client device corresponds to the second display screen associated with the second type of the client device.

20. The non-transitory computer-readable medium of claim 13, wherein the instructions executable by the processor further cause the computer to:

receive first a device identifier associated with the first type of the client device.

* * * * *